United States Patent [19]

Gagneraud

[11] 4,152,131

[45] May 1, 1979

[54] DEVICE FOR IMPROVING EXPANSION OF METALLURGICAL SLAG AND CINDER BEFORE GRANULATION AND METHOD FOR USING SAME

[76] Inventor: Francis Gagneraud, Villa Montmorency 6, Allee des Tilleuls, Paris, France, 75016

[21] Appl. No.: 922,239

[22] Filed: Jul. 5, 1978

[30] Foreign Application Priority Data

Sep. 2, 1977 [FR] France ................................ 77 26651

[51] Int. Cl.² ............................................ C03B 37/00
[52] U.S. Cl. ......................................... 65/20; 65/19; 65/141
[58] Field of Search ............................. 65/19, 20, 141

[56] References Cited

U.S. PATENT DOCUMENTS

| | | | |
|---|---|---|---|
| 2,044,450 | 6/1936 | Schol | 65/141 |
| 3,523,775 | 8/1970 | Rueckl | 65/19 |
| 3,594,142 | 7/1971 | Margesson et al. | 65/20 X |
| 4,115,089 | 9/1978 | Metz et al. | 65/19 |

FOREIGN PATENT DOCUMENTS

751157  6/1956  United Kingdom ........................ 65/20

Primary Examiner—Robert L. Lindsay, Jr.
Attorney, Agent, or Firm—Browdy and Neimark

[57] ABSTRACT

A device for expanding slag and cinder comprises a channel for carrying molten slag and provided with a lip serving as a spreader to spread out the melt in the form of a thin sheet, the lip being cooled internally; an inclined hollow cooling element constructed in the form of one or more boxes staggered heightwise, and in which cooling water circulates under pressure; nozzles immediately downstream of the lip to feed the cooling water from the cooling element to spray the slag; and a rotating drum which throws the slag into the air before pellets or granules are collected in a sloping collector to remove the non-evaporated water.

6 Claims, 6 Drawing Figures

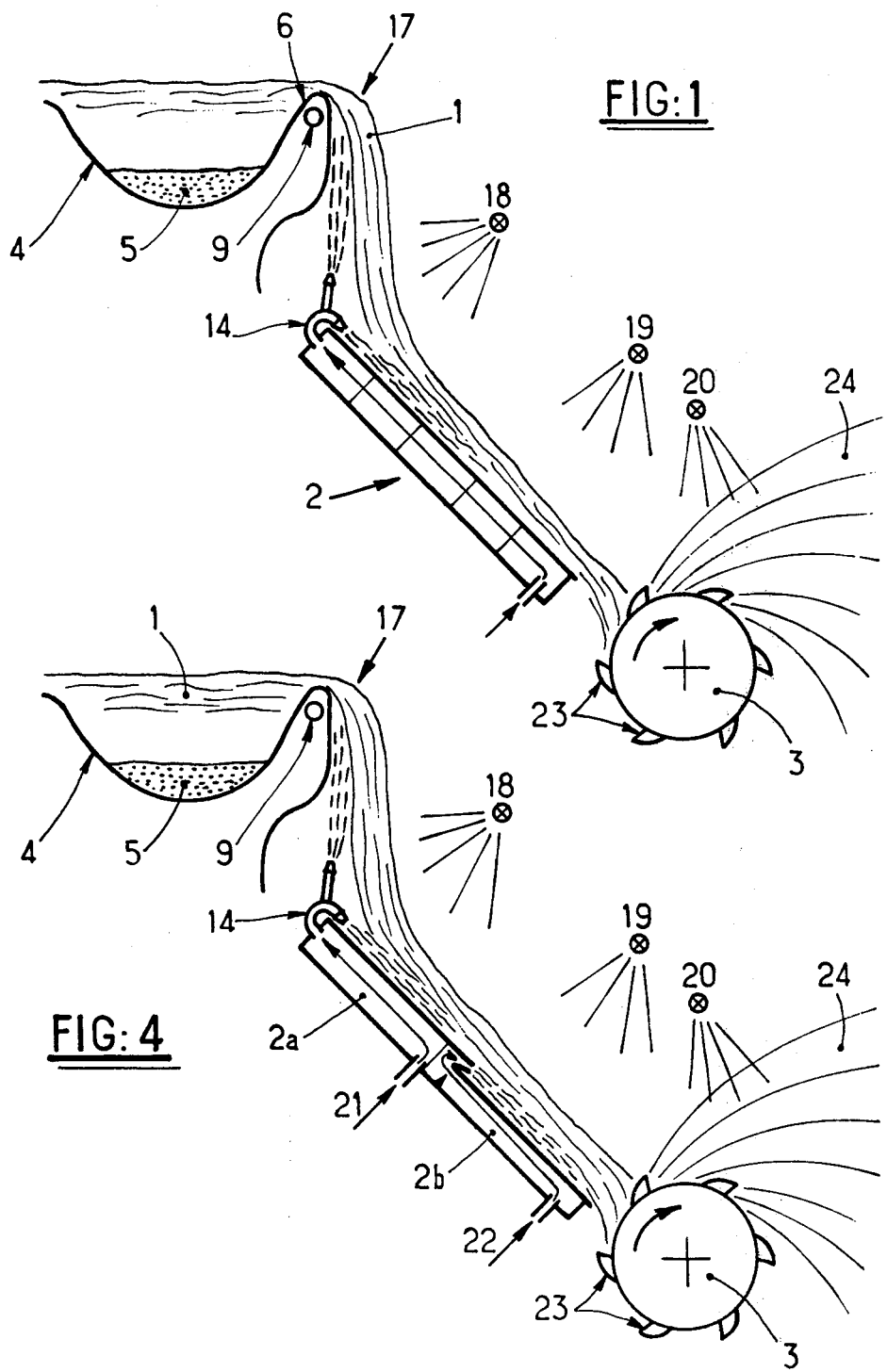

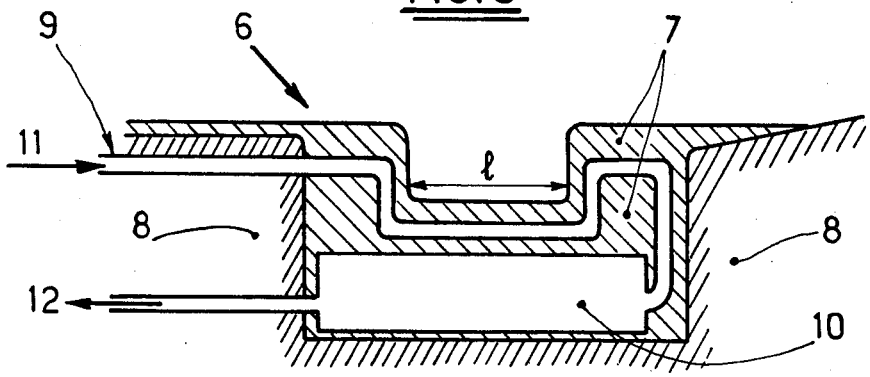
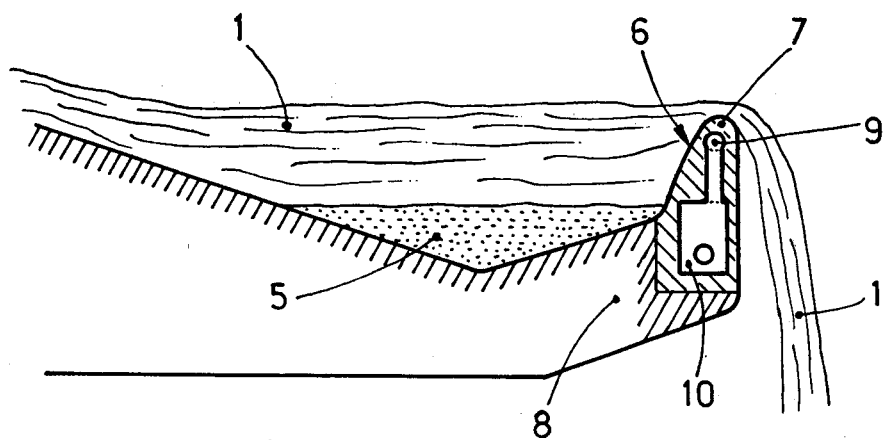
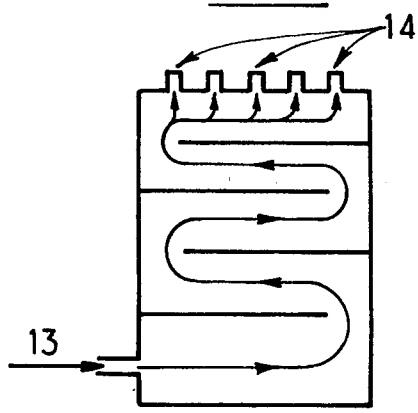
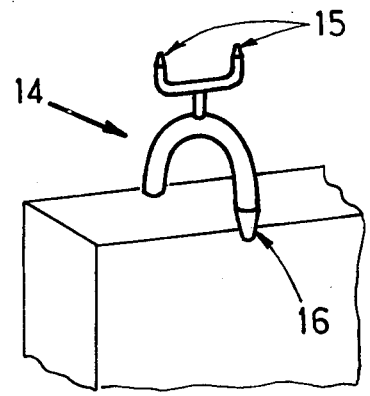

DEVICE FOR IMPROVING EXPANSION OF METALLURGICAL SLAG AND CINDER BEFORE GRANULATION AND METHOD FOR USING SAME

FIELD OF INVENTION

The present invention relates to the handling of cinders and slag obtained during the manufacture and processing of steel as well as non-ferrous metals, and, more particularly, the invention is especially suitable for processing blast furnace slag, dispersed by means of a rotating drum, thereby providing a material broken up into globules and granules with a vitreous structure after cooling. The invention can also be used upstream of any other granulation process wherein the molten material is dispersed by the action of jets of water or gas which also act as cooling agents.

BACKGROUND OF INVENTION

Numerous processes have already been described for granulation of metallurgical slag, wherein pressurized water or gas is used to confer hydraulic shocks on a stream of molten slag. The various techniques used in this process employ systems of inclined planes, rotating drums, and screens, followed by discharge channels or conveyor belts, etc., these systems representing a considerable investment. Moreover, it is very difficult to consistently and reproducibly obtain for a given arrangement of devices and a number of fixed parameters, an end product which has the generally desired characteristics; thus, either a majority of pellets or spherical particles is obtained, or, if the desired form is granular, the grains suffer from incomplete vitrification, excess water content, or difficulty in crushing. Finally, the majority of these known techniques require the use of very large quantities of water, often as much as 10 m³/ton of slag, the water having the double purpose of acting as a coolant and a means of dispersing the slag.

SUMMARY OF THE INVENTION

The invention allows the above disadvantages to be overcome and economically and effectively solves the problem of granulation of molten slag. This, in turn, is accomplished using only a limited amount of equipment, and using only small quantities of water, generally on the order of 1 to 2 m³/ton of slag, and results in a product which exhibits excellent physical characteristics and in particular contains only a very small amount of residual water.

The new system according to the invention allows slag and clinker to be expanded between the drainage channel, where they are in a molten state, and the final phase of granulation. The invention may be embodied in a device comprising essentially the following components:

(a) a lip cooled internally by water, mounted at the end of the drainage channel or ladle, and serving to spread the molten material into a thin film of fixed width;

(b) a hollow element inclined relative to the essentially vertical trajectory of the molten film leaving the lip, such element being provided with internally circulating water and with at least two water injection nozzles on a ramp located at its upper end, one of the nozzles spraying the water immediately downstream of the lip, while the other sprays water to circulate downwardly on the supper surface of the inclined hollow element; the slag film, cooled and expanded, is then entrained by a rotating bladed drum according to known techniques, the drum breaking up and throwing the slag particles into the air along a parabolic trajectory, the particles being braked by air resistance before falling into a sloping collector for the resultant granules.

According to another characteristic of the invention, the slag sheet is also subjected to the kinetic action of a plurality of independent jets of water from nozzles mounted on the ramps of the hollow element as the film moves along its trajectory between the lip and the drum.

Thus, the process essentially combines two complementary methods of forming granular particles from a sheet of molten slag: a partial division of the slag mass under the influence of the kinetic energy from the water jets which attack the slag sheet at different angles, supplemented by the dispersion achieved with the aid of a rotating drum.

Hence, water consumption can be reduced considerably since the principal purpose of this fluid is as an expansion and cooling agent. Molten slag at a temperature of 1450° C. has an enthalpy $H(H_\theta - H_{25})$ of 422.5 therms per metric ton. A total of 0.615 therms is required to evaporate 1 liter of water with an initial temperature of 25° C.; consequently, it is theoretically necessary to use 687 liter of water to cool 1 metric ton of slag to 25° C. from 1450° C. However, slag treated in this fashion has a vitreous structure, and thus retains a potential energy which it releases when crystallized. This energy can reach 80 therms per metric ton of slag after the latter has been completely vitrified, which corresponds to evaporation of 130 liter of water. Practically speaking, approximately 0.8 to 2 m³ of water is used per metric ton of slag to be processed.

According to another characteristic, the inclined hollow element, which serves as an internally cooled feed table, can be comprised either of a single box or of a double box with independent water circuits, the surfaces or plates of which are staggered to form a discontinuity which forces the slag to drop a short distance from one plate to the other in each of the boxes.

BRIEF DESCRIPTION OF INVENTION

Other characteristics of the invention will be apparent from the detailed description which follows, relating to the non-limiting embodiments illustrated in the attached drawings:

FIG. 1 is a schematic diagram showing a device according to the invention in cross section;

FIG. 2 is a top view of an inclined hollow element or feed table;

FIG. 3 shows a detail of a design of one of the nozzle ramps, with which the upper part of the hollow element is provided;

FIG. 4 is a schematic diagram of another embodiment according to the invention wherein the hollow element is comprised of two associated hollow boxes, staggered heightwise;

FIG. 5 is a detailed illustration in cross section of an internally cooled lip; and FIG. 6 is a side view of a slag holding tank with the lip according to FIG. 5.

DETAILED DESCRIPTION OF EMBODIMENTS

In the installation shown schematically in FIG. 1, a stream 1 of molten slag is subjected to a series of injections and sprayings with water, as it flows down an inclined plane 2, arriving at a rotating bladed drum 3, which throws the slag into the air and then collects it in the form of pellets or granules in a collector (not shown).

In practice, the stream of slag 1 can come either from a ladle of a channel of a blast furnace or converter, or from a flow control device mounted on a slag drain channel (see for example, French Pat. No. 76,28855, of Sept. 24, 1976). According to a preferred embodiment shown in FIGS. 1, 4, 5 and 6, the control device consists of a channel 4 whose bottom permits decanting and draining of molten iron 5, entrained in the slag, and provided with a lip 6 made of refractory, functioning as a retainer which spreads the molten slag into a film of a given width "l".

According to an improved embodiment of the invention, the lip 6 of the channel is efficiently cooled in order to produce a definite increase in its service life and to increase the wear resistance of refractory material 7 of which the lip is formed (for example, lining puddled clay), as well as a concrete lining 8 which forms the channel 4 and is usually subjected to damage from heat. This cooling can be achieved by passing a current of water through a pipe 9 imbedded in the refractory material 7, the water then being sent into a box 10 which provides the heat protection described above. The circulation of the water is represented schematically in FIG. 5 by arrows 11 (in) and 12 (out).

Slag 1, running over the lip 6, then falls onto the hollow element 2, representing a plane inclined at approximately 45°, after being subjected (as will be described hereinbelow in greater detail) to a series of water injections as close as possible to the lip 6.

This hollow element or feed table 2, shown in greater detail in FIG. 2, consists essentially of a box whose upper and lower surfaces consist of sheet metal of a certain thickness (for example, 15 and 10 mm respectively), between which the water circulates at a pressure of approximately 3 to 5 bars. The water is conducted to the lower part of the box and fed thereinto through an input port 13, and the water exits through a series of pipes 14 (five in the embodiment shown in FIG. 2), with a preferred embodiment being shown in FIG. 3. Each pipe is provided with a plurality of nozzles, for example three, two ends 15 of which are used for injecting water upwardly beneath the lip 6 while the other, 16, preferably points downwardly but in any event in such a direction as to provide a stream of water to the upper surface of the inclined plane. Thus, this design permits the water to be supplied on the one hand for expansion of the slag (nozzles 15 directed upward) and for transport of the slag (nozzles 16) to rotating drum 3. It will be noted that the action of the water jets sweeping the upper surface of the feed table 2 is amply sufficient to entrain all of the slag and carry it to drum 3, thus making it possible to eliminate the previously conventional installation of electric or pneumatic vibrators.

According to the invention, the water jets emerging from nozzles 15 must be provided in a zone 17 immediately downstream and as close as possible to lip 6 so that the water, which is evaporated, will have a longer period of time in which to have its effect. A drop of 80 cm in this zone is reflected by a loss of 0.4 second for expansion. The amount of water injected into the slag at this point must be such that the temperature of the slag will be reduced to approximately 1300° C. so that the latter will have the necessary viscosity for good expansion. It is known that good expansion is characterized by a good stability of the slag froth, which must retain the bubbles of gas formed by the water inside the slag. As stated above, the water pressure is generally held between approximately 3 and 6 bars.

According to an improved embodiment of the invention, an additional amount of water can be provided by spray ramps 18, 19, and 20, mounted above the feed table 2 and designed to cool the slag as it drains off the table before it is scattered and thrown in the air by drum 3.

According to an embodiment shown in FIG. 4, the hollow feed table 2 can be divided into two independent boxes 2a and 2b, each of which is traversed by a stream of water. Water introduced through port 21 into the box 2a emerges from the upper part to supply nozzles 15 and to push, by means of nozzles 16, the slag froth toward the feed table; the cooling water introduced through port 22 into the box 2b then serves exclusively to transport the slag toward the drum 3. This staggered design for the feed table in many instances allows a greater ease of adjustment of the amount of water used for spraying and conveyance.

The advantages provided by the combination according to the invention of a lip and a hollow element or cooled table, in the form of a single stage or a cascade, are numerous. They include, in particular: a longer lifetime for the material used, better distribution of the molten material, a gradual expansion of the slag, controlled cooling of the slag following its expansion, reduction of operating costs owing to the use of plates in the hollow element which are made of simple sheet metal instead of refractory materials used until now which are expensive and fragile.

After flowing over hollow element 2, the mixture of non-evaporated droplets of water and particles of slag is thrown into the air by blades 23 of drum 3, describing a parabolic trajectory 24 and braked by the resistance of the ambient air. The solid slag particles, expanded and vitrified, then accumulate in a sloping collector in the form of a pile, while the unevaporated water runs away toward the low point of the collecting gutter and is removed by known means (pumping, filtration, etc.).

In a slag treatment process of this kind, the water consumption in much less than in classic methods. Indeed, it is on the order of only 1 $m^3$/metric ton of molten slag for pelletizing and approximately 2 to 2.5 $m^3$/metric ton of slag for granulation.

Although the pellets or granules of slag obtained by working the process according to the invention in any of the versions described hereinabove, ensures good expansion characterized by a low mass per unit volume, the pore-forming effect can be increased if desired by introducing into the slag, for example, at the level of spray ramps 18 and 19, gas-generating agents which produce pores by thermal decomposition, as, for example, the carbonates of alkaline earths or mixtures of carbonaceous products and products of free carbon, such as barren ore and dust from blast furnace gases (see U.S. Pat. No. 4,062,672; and French Pat. No. 76,38039 of Dec. 17, 1976).

The granulated slag and clinker obtained according to the process of the invention can be used under the same conditions and in the same areas as classic granulated slags as, for example: feedstock for the water-based binder industry (cement), glass and ceramics, tiles, bricks, concrete, and other construction materials; as a binder for road-building; as a scouring material for metal; as fertilizer and soil-improver, etc.

It will be obvious to those skilled in the art that various changes may be made without departing from the scope of the invention and the invention is not to be considered limited to what is shown in the drawings and described in the specification.

What is claimed is:

1. A device for processing metallurgical slag and clinker to ensure the expansion thereof, comprising:
   (a) a lip cooled internally by water, mounted at the end of a channel adapted to contain molten slag, said lip serving to retain the molten mass and spread it out in a thin film of predetermined width during pouring of the slag vertically from the lip; and
   (b) a hollow element inclined relative to the essentially vertical trajectory of the molten slag, said element being provided with means to circulate water internally thereof and equipped at the end thereof closest to said lip with a pair of water injection nozzles, one nozzle constituting means to eject water immediately downstream of the lip and the other nozzle constituting means to circulate water to the upper surface of said inclined hollow element.

2. A device according to claim 1, further comprising means to subject the slag along its trajectory between the lip and the drum to the kinetic action of a plurality of jets of water, independent of said nozzles.

3. A device according to claim 1, wherein said lip is oblong in shape and is provided internally with piping and a water box, whereby heat damage to the material composing the slag holding tank with its lip is inhibited.

4. A device according to claim 1, wherein said hollow element is composed of a single box with upper and lower surfaces made of sheet metal, said box being provided with a series of ramps fitted with multiple water injection nozzles.

5. A device according to claim 1, wherein said hollow element is composed of a double box with independent water circuits, whereby water emerging from the uppermost of said boxes is adapted to feed the jets and to entrain the slag foam moving along the upper surface of said box, while the cooling water emerging from the lower box is adapted to transport the slag toward said drum.

6. A method for cooling molten slag of about 1450° C., comprising
   (1) pre-cooling said molten slag while in the lip of a drainage channel or ladle;
   (2) spreading said pre-cooled molten slag into a layer of predetermined width and pouring said molten slag from said lip as a film of approximately said width into a generally vertically downward trajectory;
   (3) impinging water in a jet under pressure of about 3-6 bars onto said film of molten slag as it leaves said lip to reduce the temperature of the slag to about 1300° C. and provide a slag froth;
   (4) passing said film of slag froth onto the upper surface of a feed table inclined at approximately 45° while impinging water in a jet between said film of slag and the upper surface of the feed table; and
   (5) internally cooling said feed table with water and then passing said water to nozzles for use in steps (3) and (4).

* * * * *